United States Patent Office 3,491,063
Patented Jan. 20, 1970

3,491,063
METHOD FOR POLYMERIZING FORMALDEHYDE
Kenichi Fukui and Tsutomu Kagiya, Kyoto, Hisao Yokota, Kobe, Masatsune Kondo, Ibaragi-shi, and Yozo Ohtsuka and Minoru Shuto, Osaka, Japan, assignors to Sumitomo Chemical Company, Ltd., and Sumitomo Atomic Energy Industries Ltd., both of Osaka, Japan
No Drawing. Filed Nov. 8, 1965, Ser. No. 506,845
Claims priority, application Japan, Nov. 14, 1964, 39/64,424; Mar. 16, 1965, 40/15,254; Apr. 14, 1965, 40/22,030
Int. Cl. C08g 1/02, 1/04, 1/24
U.S. Cl. 260—67
3 Claims

ABSTRACT OF THE DISCLOSURE

Formaldehyde prepared by thermal decomposition of alpha-polyoxymethylene without preliminary purification is polymerized in liquefied carbon dioxide, at temperatures in the range 0° to 80° C. in a pressure vessel. If desired, an organic solvent having a boiling point up to 40° C. may be mixed with the liquefied carbon dioxide. Polymerization is initiated by merely warming the reaction system of 10° to 80° C. or by exposing it to an ionizing radiation at a lower temperature. The unreacted monomer and the solvent are separated from the solid polymer product merely by reducing the pressure in the reaction vessel. Optionally, its polymerization may be effected in the presence of carboxylic acid anhydride, and after separation of the unreacted monomer and the solvent, the resulting polymer is heated at 150° C., whereby an esterified polymer having superior properties is obtained.

---

The present invention relates to a novel process for producing a high molecular weight polymer of formaldehyde, and further relates to a novel process for producing a thermally stable formaldehyde high polymer by acylating the terminal groups of the formaldehyde high polymer.

It has been known from long ago that formaldehyde may polymerize to form a solid polymer, as described in H. Staudinger, "Die Hochmolekularen Organischen Verbindungen," Springer-Verlag, Berlin, 1960 and J. F. Walker, "Formaldehyde," 2nd Ed., Reinhold Pub. Co., New York, 1953. However, the resultant polymers were not suitable as a plastic material, because they were of a relatively low molecular weight, a poor thermal stability and an inferior toughness.

Since R. N. MacDonald disclosed a process for producing a useful formaldehyde high polymer from substantially anhydrous formaldehyde in U.S. Patent No. 2,768,994, there have been proposed various processes for producing a useful high molecular weight polymer of formaldehyde such as a catalyst process of using an amine, an organic metal compound or the like catalyst or ionizing radiation process of using γ-ray or the like radiation. However, in each of these known processes, it is necessary to purify the starting monomer by severely removing a very small quantity of any water contained in the material, that is, to employ substantially anhydrous formaldehyde as the starting material.

The polymerization is usually carried out in an organic solvent or dispersion medium in order to facilitate the removal of the polymerization heat, although a bulk polymerization without any solvent may be carried out in a few cases. Therefore, the use of a highly purified solvent or dispersion medium is required in these cases, and it is also necessary to separate and remove the organic solvent or dispersion medium employed in order to isolate the resultant polymer.

We have made an intensive study of the polymerizability of formaldehyde and have disclosed that the undesirable spontaneous polymerization of formaldehyde may be inhibited by adding an anhydride of an organic or inorganic acid to the polymerization system (Belgian Patent No. 639,513) and that a radiation-induced polymerization, which had been heretofore carried out at a low temperature up to −50° C., may be carried out at an advantageous temperature in the neighbourhood of room temperature (Belgian Patent No. 639,332).

We have further studied the effect of carbon dioxide on the polymerization of formaldehyde, and have now found that a high molecular weight polymer free from an undesirable low molecular weight polymer, which may be used as a plastic, may be readily prepared by polymerizing formaldehyde in carbon dioxide as a solvent or dispersing agent instead of the organic solvent, even if a relatively impure formaldehyde monomer is employed as the starting material.

Also, we have found that the separation of the polymer and the recovery of the unreacted monomer and the solvent may be very easily accomplished by this process.

We have found that carbon dioxide and formaldehyde are perfectly soluble in each other and a solution of any ratio may be prepared by adding carbon dioxide under pressure to cooled and liquefied formaldehyde. Thus, a uniform solution having any concentration may also be obtained by adding Dry Ice as carbon dioxide to liquid formaldehyde or compressing and liquefying a gaseous mixture of formaldehyde and carbon dioxide in any ratio.

It has been found that the resultant solution is very stable and remains as a clear monomer solution for many hours when it is allowed to stand in a pressure vessel up to 0° C. and that any low molecular weight polymer is hardly formed. Thus, the stabilization of formaldehyde, which had never been obtained by any prior known process, was readily accomplished.

Further, it has been found that a high molecular weight polymer of formaldehyde may be formed by initiating the polymerization by exposing such a formaldehyde-carbon dioxide solution to an ionizing radiation or by simply heating at an elevated temperature, and that the resultant formaldehyde high polymer is free from an undesirable low molecular weight polymer and has very useful properties as a plastic.

Thus, a high molecular weight polymer, which had been hitherto obtained only in a substantially anhydrous polymerization system, may be readily obtained from a substantially unpurified formaldehyde monomer.

Further, the process of the present invention has a very important advantage in that a polymer may be easily isolated from carbon dioxide and any unreacted formaldehyde simply by reducing the pressure of the system to an atmospheric pressure after the completion of the polymerization.

Another preferable advantage of the process of the present invention resides in that a polymerizing solution may be simply reprepared by adding a required quantity of formaldehyde vapor into a separated gas phase to adjust the monomer concentration and compressing and liquefying the mixture. Thus the solvent, carbon dioxide, and unreacted formaldehyde may be readily recovered and recycled.

These advantages have never been obtained by any prior known process for preparing a high molecular weight polymer of formaldehyde, and it may be expected that these advantages have a very important meaning as a commercial process.

The formaldehyde monomer employed in the above-mentioned process may be one obtained by the thermal decomposition of α-polyoxymethylene, which may be employed as such without any further purification and usually contains about 1 percent of water.

It has been also found that the molecular weight of the resultant polymer is not reduced and the polymerization rate may increase gradually with the increase of the moisture content, even if an additional amount of water is positively added to the formaldehyde monomer thus obtained.

Since the prior processes for polymerizing formaldehyde with a catalyst or by exposing to ionizing radiation have been carried out as a bulk polymerization or in an organic solvent such as a hydrocarbon and the like, water present together has acted as a chain transfer agent to prevent the propagation of main chain and thereby the polymerization degree of the resultant polymer has been reduced and the properties of the product has been deteriorated. Therefore the formaldehyde monomer employed in these processes should have been highly dehydrated and purified.

On the other hand, in the process of the present invention water loses an activity as a chain transfer agent and thereby the polymerization degree of the product is not reduced, because a large quantity of carbon dioxide is dissolved in the polymerizing system.

It has never been imaginable from any prior process that the polymerization degree of the resultant polymer is not reduced even if the moisture content in the formaldehyde exceeds 20 percent by weight, as will be definitely illustrated in the examples.

The carbon dioxide employed in the present invention may be any commercially available product having a purity of 99 percent, and it is unnecessary to specially purify the product. Any solid carbon dioxide commercially available as dry ice may be also employed. While the amount of carbon dioxide added depends upon the polymerization condition, it may be generally from 5,000 to 10 percent by weight, and preferably 500 to 25 percent by weight, based upon the weight of the formaldehyde monomer.

An organic solvent, which is chemically inert to formaldehyde, other than carbon dioxide may be also added in the practice of the present invention. The organic solvents, which may be employed, include aliphatic ethers, aromatic ethers, alicyclic ethers, aliphatic carboxylic acid esters, aromatic hydrocarbons, aliphatic hydrocarbons, halogenated aliphatic hydrocarbons, nitriles, ketones, aldehydes and acetals. In consideration of the easiness in the separation of the polymer, a compound of low boiling temperature such as ethane, butane, propane, tert-pentane, dimethyl ether, diethyl ether and the like is particularly preferable, because these volatile compounds may be readily separated from the polymer by evaporating them together with carbon dioxide and unreacted formaldehyde. One of these organic solvents may be used alone, but the mixture of two or more may be also added.

While these organic solvents may be used in a volume ratio of 1/100 to 100/1 to the mixed solution of formaldehyde and carbon dioxide, a particularly preferable quantity added is 1/50 to ½.

In the practice of the present invention a formaldehyde having a water content up to 20 percent by weight may be satisfactorily employed, and such a material may be obtained by concentrating a neutral formaldehyde solution. However, a preferable formaldehyde material may be generally obtained by the thermal decomposition of solid polymers of low molecular weight such as α-polyoxymethylene, paraformaldehyde, trioxane or the like.

The product, obtained by thermally decomposing such a solid polymer in an inert gas stream, may be employed as such, since it is usually unnecessary to remove water contained therein. Carbon dioxide is most perferably employed as the inert gas, because it is required to add carbon dioxide in the practice of the present invention. This procedure has an advantage in that a desirable solution of formaldehyde in carbon idoxide may be directly obtained by cooling or compressing the gas stream leaving a thermal decomposition vessel.

There are 2 processes for initiating the polymerization of formaldehyde according to the present invention, as described above. Thus, the polymerization of formaldehyde may be initiated by exposing to ionizing radiation, or by simply raising the temperature of the polymerization system. These 2 processes will be explained as follows:

The ionizing radiation employed for initiating the polymerization by irradiation is most preferably an electromagnetic wave having an excellent penetrating property such as X-ray, γ-ray and the like, because the reaction is usually carried out in a high pressure vessel. However, β-ray equipped inside the vessel by a suitable means may be also employed.

The polymerization may also be achieved by simply selecting a suitable temperature of the polymerization system without the use of any catalyst or an ionizing radiation.

Here, the range of the temperatures will be generally explained which may be employed for polymerizing formaldehyde according to the process of the present invention.

Without the use of an ionizing radiation, the temperature within the range of 10° C. to 80° C. is preferable, because the polymerization rate is very slow at a temperature lower than 10° C.

Also, when an ionizing radiation is employed, the temperature within the range of −78° C. to +20° C. preferably −20° to +20° C. is chosen. While the polymerization may be accomplished by simply raising the temperature of the polymerization system without the use of an ionizing radiation in the process of the present invention, the polymerization pressure may become high in this procedure, and, in some cases, may reach 100 kg./cm². If the polymerization rate is accelerated by the use of an ionizing radiation, the polymerization temperature will be reduced and thereby the polymerization presure will be also lowered.

The process using carbon dioxide as a reaction medium of the present invention is also advantageously applied to the process of producing copolymer of formaldehyde and an anhydride of aliphatic, alicyclc or aromatic polybasic carboxylic acid.

The following examples illustrate several embodiments of the process for polymerizing formaldehyde according to the present invention. It is not intended to limit the invention to these examples.

EXAMPLES 1 TO 6

α-Polyxymethylene, which had been previously dried, was placed in a flask. After the inside of the flask was displaced with carbon dioxide, α-polyoxymethylene was heated to thermally decompose into formaldehyde vapour.

The formaldehyde was transferred into a glass container, which had been previously cooled at −78° C., with carbon dioxide introduced into the flask through another inlet.

The liquid thus collected was a solution of formaldehyde in carbon dioxide. The concentration of formaldehyde may vary within the range of 62 percent to 60 percent by weight, depending to some extent upon the production rate of formaldehyde and the flow rate of carbon dioxide.

The carbon dioxide employed was a commercial product in a cylinder as such.

In these examples the concentration of formaldehyde was 60.5 percent by weight. Into a small autoclave having a capacity of 430 ml., which had been previously evacuated and cooled to −78° C., a given quantity of said solution was respectively charged. The charge was determined by a gravimetric method.

After the autoclave had been closed, it was dipped in a bath of a given temperature for a given period of time to carry out the polymerization as shown in Table 1. After the completion of the polymerization reaction, a valve was opened to release unreacted formaldehyde and carbon dioxide. The polymer remained in the autoclave was washed with methanol, filtered, dried in vacuo and weighed. The results of the experiments are shown in Table 1.

In this table inherent viscosity $\eta_{60}°$ is a value obtained by measuring on a solution of 0.5 gram of the polymer dissolved in 100 ml. of p-chlorophenol containing 2 percent of α-pinene at 60° C., and melting point is a value observed with a micro melting point measuring apparatus made by Yanagimoto Seisakusho.

dioxide prepared in the same manner as in Examples 1 to 6.

Into an autoclave having a capacity of 30 ml., which had been previously charged with a given quantity of water as set forth in Table II, cooled to −78° C. and evacuated, a given quantity of the solution of formaldehyde and carbon dioxide thus prepared was charged and a suitable additional quantity of carbon dioxide was added to adjust the concentration. The measuring of the charges of these additives was carried out with a balance except

TABLE 1

| | Reaction Condition | | | Results of Experiment | | |
|---|---|---|---|---|---|---|
| | Charge, gr. | Reaction temp. ° C. | Reaction time, min. | Polymer, gr. | Polymerization rate, percent/min. | Inherent Viscosity, $\eta_{60}°$ | Melting Point, ° C. |
| Examples: | | | | | | | |
| 1 | 20 | 0 | 120 | 0.417 | 0.03 | 0.85 | 172~5 |
| 2 | 13.6 | 18 | 20 | 0.392 | 0.08 | 0.81 | 172~4 |
| 3 | 11.0 | 38 | 6 | 0.838 | 1.95 | 1.12 | 175~7 |
| 4 | 11.1 | 56 | 5 | 2.404 | 5.54 | 1.39 | 174~6 |
| 5 | 12.1 | 66 | 5 | 3.265 | 9.00 | 0.99 | 172~5 |
| 6 | 14.5 | 80 | 5 | 4.060 | 9.30 | 0.80 | 172~4 |

EXAMPLE 7

The concentration of formaldehyde was 63 percent by weight in the solution of formaldehyde and carbon dioxide prepared in the same manner as in the preceding Examples 1 to 6. 125 grams of this solution was charged into an autoclave having a capacity of 500 ml. while cooling in the same manner as in Examples 1 to 6. The whole was heated to an internal temperature of 62° C. while stirring and maintained at the temperature for 5 hours. The internal pressure was 93 kg./cm.²

A valve was then opened to release the interior gas, but the odor of formaldehyde was not detected in the released gas at all. The yield of the resultant powdery polymer was 78 grams. This polymer had an inherent viscosity $\eta_{60°}$ 1.91 and completely melted at a temperature range of 173° C. to 175° C.

EXAMPLE 8

The concentration of formaldehyde was 60.0 percent by weight in the solution of formaldehyde and carbon dioxide prepared in the same manner as in Examples 1 to 6.

36.4 grams of this solution was charged into an autoclave having a capacity of 180 ml. and maintained in a warm bath at 35° C. for 1.5 hours. The final pressure was 40 atmospheres. After releasing unreacted formaldehyde and carbon dioxide, the resultant powdery polymer was removed out. The yield of the product was 14.3 grams and the inherent viscosity $\eta_{60°}$ thereof was 2.09.

EXAMPLES 9 TO 15

The concentration of formaldehyde was 61.5 percent by weight in the solution of formaldehyde and carbon the addition of water with a calibrated pipet or microcylinder.

The reaction was then carried out by dipping the autoclave thus arranged in a thermostat kept at 10° C. for 20 minutes. Carbon dioxide was released and the content was removed. The resultant polymer was thoroughly washed and dried in vacuo. The yield and inherent viscosity of the polymers thus prepared was shown in Table 2.

TABLE 2

| | Composition | | | | Yield of Polymer (percent by weight) | Inherent Viscosity |
|---|---|---|---|---|---|---|
| | $CH_2O$, gr. | $CO_2$, gr. | $H_2O$, mg. | Polymer, gr. | | |
| Examples: | | | | | | |
| 9 | 8.0 | 8.1 | 2 | 0.29 | 3.8 | 1.04 |
| 10 | 7.6 | 8.5 | 12 | 0.42 | 5.6 | 1.01 |
| 11 | 8.2 | 9.7 | 22 | 0.37 | 4.2 | 1.00 |
| 12 | 8.3 | 9.0 | 110 | 0.80 | 9.6 | 1.15 |
| 13 | 8.0 | 9.7 | 230 | 0.64 | 8.0 | 1.01 |
| 14 | 6.4 | 8.9 | 540 | 0.80 | 12.6 | 1.02 |
| 15 | 8.1 | 9.1 | 1,730 | 0.98 | 12.1 | 0.96 |

It is seen from Table 2 that the inherent viscosity of the polymer was not decreased but the yield of the polymer increased with the increase of the concentration of water, even if the concentration of water exceeded 20 percent by weight of formaldehyde.

EXAMPLE 16

152 grams of a solution of formaldehyde and carbon dioxide (the concentration of formaldehyde: 61.3 percent by weight), which had been prepared in the same manner as in Examples 1 to 6 was charged into an autoclave having a capacity of 500 ml. while cooling at −78° C. The content was then warmed up to 0° C. and stirred for 2 hours while exposing at a dose rate of 6,000 r./hr. to γ-ray from Co-60.

The internal pressure of the autoclave, which had been 15.2 kg./cm.² at the start of the irradiation at 0° C., gradually increased as the reaction proceeded and reached 26.4 kg./cm.² at the end of the irradiation duration. After the irradiation carbon dioxide and unreacted formaldehyde were released by reducing the internal pressure to an atmospheric pressure. In the autoclave powdery polymer was obtained. The polymer was washed with methanol and successively with water and dried in vacuo. The yield of the polymer was 56.7 grams and the inherent viscosity of the product $\eta$ was 1.34.

A process for polymerizing formaldehyde to form a plastic cheaper than that obtained by any prior process was established by any of the above-mentioned processes which comprises polymerizing the formaldehyde obtained, for example, by the thermal decomposition of paraformaldehyde or α-polyoxymethylene without any further purifying process of the material.

The polymer obtained has hydroxyl groups at both ends of the main chain thereof and is subject to thermal decomposition.

Therefore, there has been reported in U.S. Patent No. 2,964,500 (1960) a process for acylating both ends of the formaldehyde polymer to improve the thermal stability of the polymer which comprises boiling the powdery polymer in an organic carboxylic acid anhydride such as acetic anhydride or the like in the presence of a catalyst such as sodium acetate or the like. In this process, 8 to 20 times weight of a carboxylic acid anhydride or an admixture thereof with an organic solvent to the polymer should be added to a formaldehyde polymer, so that the losses of the carboxylic acid anhydride and the organic solvent are large in the separation and recovery of them from the resultant acylated polymer. Also, because the polymer, which have already polymerized, is employed in this process, polymerization and acylation stages are respectively in separate reaction vessels and thereby this process may be complicated.

On the other hand K. Wagner et al. has reported in U.S. Patent No. 3,135,718 (1964) a process for acylating a formaldehyde polymer which comprises carrying out a catalytic polymerization of formaldehyde in an acylating agent, that is, an organic acid anhydride as a solvent, and then heating the resultant polymer as such without separating the polymer from the solvent. Since an acylating agent is employed as a polymerization solvent in this process, it is also required to employ several times weight of the acylating agent for the resultant polymer, so that the loss of the organic acid anhydride is increased in the recovery thereof. Also, the formaldehyde material should be purified so that the moisture content thereof may be up to 0.1 percent.

We have made a further study for the purpose to obtain a thermally stable polymer in the polymerization of formaldehyde in a carbon dioxide solvent, and we have now found a process for obtaining a formaldehyde polymer having a very excellent thermal stability which comprises carrying out a polymerization reaction by adding a carboxylic acid anhydride at the start of the polymerization of formaldehyde in carbon dioxide solvent and maintaining the whole at a temperature of 10° C. to 80° C., and then heating the reaction system as such to a temperature higher than 100° C., and preferably a temperature of 150° C., after the completion of the polymerization reaction, or by returning the reaction system to an atmospheric pressure to recover carbon dioxide and unreacted formaldehyde and then heating the system at a temperature higher than 100° C., and preferably at a temperature of 150° C.

It has been found that, in this process, the carboxylic acid anhydride present together from the start of the polymerization does not prevent the propagation reaction to produce high molecular weight polymer of formaldehyde. Moreover, it has been also found that a polymer having the acylated terminal groups has been already formed in the polymerization stage.

However, it has been seen from an infrared absorption spectrum and the measurements of a thermal decomposition rate of the polymer obtained that the thermal stabilization by the terminal acylation is not completed under such a reaction condition. Thus, for example, by the polymers obtained at 20° C and 60° C. the presence of ester carbonyl groups at the ends of polymer chain was confirmed from an infrared absorption spectrum and it was found that the ends of the polymers have been already acylated, but the acylation degrees were respectively only 35 mol percent and 62 mol percent. By an acylation degree is meant the value of the ratio of the absorption intensity of carbonyl group at 1750 cm.$^{-1}$ to the sum of the absorption intensity of hydroxyl group at 3480 cm.$^{-1}$ and carbonyl group, multiplied by a correction factor experimentally obtained. This acylation degree may represent the degree of the thermal stabilization for the end groups.

It has been also found from the rate constant $k_{222°}$ for the thermal decomposition reaction in a nitrogen atmosphere at 222° C. obtained as a first-order reaction that only about 50 percent of the polymer chain ends has been thermally stabilized.

However, it has been found that the acylation may be 100 percent accomplished and a polymer having a very excellent thermal stability may be formed, if the polymer is heated at a temperature of 100° C. to 150° C. after the polymerization.

An embodiment of the present invention will be then illustrated. Formaldehyde are simultaneously polymerized and partially acylated by compressing and liquefying the formaldehyde obtained by the above-mentioned process with carbon dioxide in the autoclave containing a carboxylic acid anhydride and then maintaining the reaction system at a temperature 10° C to 80° C. Then the acylation reaction is completed by heating the reaction system as such as a temperature higher than 100 °C., and preferably a temperature of 150° C. The acylation is also carried out by heating the reaction system at a temperature higher than 100° C., and preferably at a temperature of 150° C., after reducing the internal pressure of the autoclave to an atmosphere to recover carbon dioxide and unreacted formaldehyde.

The polymerization and acylation may also be accomplished simultaneously by a continuous process in which a solution of formaldehyde and a carboxylic acid an anhydride in carbon dioxide prepared by compressing and liquefying these components of a given composition passes through zones of a reaction flow system maintained at different temperatures so that the solution may retain in the zone for a given period of time.

The above-mentioned processes for preparing a thermally stable high molecular weight polymer of formaldehyde have not only an above-mentioned advantage that it is unnecessary to highly purify the formaldehyde monomer material and that the recovery of unreacted monomer and solvent and the separation of polymer may be readily accomplished, but also the following advantage. As already stated, the ends of the resultant polymer chain are subject to acylation and the acylation reaction has proceeded to some extent already in the polymerization stage since the carboxylic acid anhydride, which is an acylating agent, is present already at the start of the polymerization reaction. Also, it is considered that the acylating agent is dispersed in a very reactive state when the whole is heated so that the acylating agent may react with the remaining hydroxyl groups after the polymerization. Namely, considering from the fact that the quantity of the carboxylic acid anhydride required is very little, it is imagined that the carboxylic acid anhydride is concentrately distributed in the neighbourhood of the hydroxyl group because of its high polarity. Thus, the prior processes required a large amount of the acylating agent, since the agent was employed as a dispersion medium, while, according to the process of the present invention, the acylation reaction may be perfectly accomplished by the addition of a small amount such as 5 mol percent of the acylating agent as illustrated in examples later.

Moreover, the acylation reaction may be then accomplished without the addition of a catalyst, which has been required in the prior processes. Therefore, the process of the present invention has an advantage that the preparation process may be simplified by omitting an operation of washing the polymer product to remove any catalyst remaining in the product which may deteriorate the properties of the product.

The carboxylic acid anhydrides, which may be employed in the present invention, include aliphatic, alicyclic and aromatic acid anhydrides such as acetic anhydride, propionic anhydride, butyric anhydride, capoic anhydride, stearic anhydride, benzoic anhydride and a substituted derivative thereof and a mixture thereof.

In the process of the present invention, the quantity of the carboxylic acid anhydride employed is generally by far less than in any prior acylation reaction, but the effect of the anhydride is enough satisfactory. The quantity added may be 5 to 50 mol percent based upon formaldehyde, although it is allowed to employ more than fifty mole percent.

While the reaction temperatures employed in the practice of the process of the present invention are different between that of the polymerization stage and that of the acylation reaction stage, the acylation reaction may be generally accomplished by heating the reaction mixture at a temperature of 100° C. to 150° C. after the polymerization of formaldehyde at a temperature of 10° C. to 80° C. If the polymerization temperature lower than the critical temperature of carbon dioxide (31° C.) is employed, the polymerization may be carried out under a pressure up to 73 atmospheres, since liquefied carbon dioxide and formaldehyde are perfectly dissolved.

On the other hand, if the polymerization is carried out at a temperature higher than the critical temperature of carbon dioxide, the pressure in the polymerization system will increase as the polymerization proceeds and in some cases it will reach a pressure higher than 100 atmospheres, since carbon dioxide is dissolved in liquefied formaldehyde.

The embodiments of the present invention will be illustrated by the following examples, which, however, should not be construed to limit the present invention.

EXAMPLE 17

The solution of formaldehyde and carbon dioxide (the concentration of formaldehyde: 60.2 percent by weight) employed was prepared in the same manner as in Examples 1 to 6.

Into a stainless autoclave having a capacity of 30 ml., 0.71 gram of acetic anhydride, which had been previously purified by a distillation, 5.4 grams of the above-mentioned solution and 4.4 grams of carbon dioxide were carefully charged while cooling with liquid nitrogen and avoiding to contact with air. Thus, by such an operation 3.24 grams of formaldehyde and 6.56 grams of carbon dioxide were added, and the amount of acetic anhydride added was 6.4 mol percent of the formaldehyde.

The autoclave, which had been thus charged with these materials, was maintained in a water bath at 20° C. for 2 hours to promote the polymerization reaction and then heated at 150° C. for 1 hours. After carbon dioxide and unreacted formaldehyde were released, the resultant polymer was removed, thoroughly washed with ether and methanol and dried in vacuo. The yield of the polymer was 2.79 grams and the inherent viscosity $\eta_{60°}$ of the polymer was 1.15. The thermal decomposition rate constant $k_{222°}$ obtained by the above-mentioned method was 0.21 percent/min.

EXAMPLE 18

An autoclave, which had been arranged in the same manner as in Example 17 except that 6.06 grams of formaldehyde, 0.04 grams of carbon dioxide and 1.0 gram (4.9 mol percent of the formaldehyde) of acetic anhydride had been charged, was maintained at a temperature of 20° C. for 2 hours to promote a polymerization reaction.

After the polymerization, the pressure in the autoclave was reduced to an atmospheric pressure to release carbon dioxide and unreacted formaldehyde. After being closed again, the autoclave was heated at 150° C. for 1 hour. The resultant polymer was removed, washed thoroughly with a distilled water and dried in vacuo. The yield of the polymer was 3.42 grams and the inherent viscosity $\eta_{60°}$ of the polymer was 1.44 and the thermal decomposition constant $k_{222°}$ was 0.31 percent/min.

EXAMPLE 19

An experiment was carried out in the same manner as in Example 17 except that 2.46 grams of formaldehyde, 1.64 grams of carbon dioxide and 1.0 gram of acetic anhydride were employed and the final heating treatment was carried out at 120° C. As the result, 1.52 grams of a polymer having an inherent viscosity $\eta_{60°}$ 1.32 and a thermal decomposition rate constant $k_{222°}$, 0.57 percent/min. was obtained.

EXAMPLE 20

An experiment was carried out in the same manner as in Example 17 except that 2.94 grams of formaldehyde, 6.26 grams of carbon dioxide and 0.7 gram of acetic anhydride were employed and the polymerization reaction was carried out at 60° C.

The polymer was obtained at a yield of 1.72 grams and had an inherent viscosity of 1.24 and a thermal decomposition rate constant of 0.26 percent/min. It has been found by a MIT folding endurance test according to ASTM D-643-43 that the sample of the polymer does not cut till the 363,000 times of folding as an average value of 5 samples.

EXAMPLES 21 TO 24

Experiments were carried out in the same manner as in Example 17 except that 1.32 grams of propionic anhydride, 2.19 grams of benzoic anhydride, 5.58 grams of stearic anhydride and 2.31 grams of caproic anhydride were respectively substituted for the acetic anhydride and 2.42 grams of formaldehyde and 1.74 grams of carbon dioxide were employed.

The yields of the resultant polymers were respectively 1.36 grams, 1.42 grams, 1.18 grams and 1.23 grams, and the inherent viscosities $\eta_{60°}$ of the polymers were respectively 1.32, 0.98, 1.67 and 1.58. Also, the thermal decomposition rate constants $k_{222°}$ were respectively 0.71, 0.23, 0.58 and 0.34 percent/min.

What we claim is:

1. A process for preparing a high molecular weight polymer of formaldehyde, which comprises decomposing a member of the group consisting of α-polyoxymethylene, paraformaldehyde or trioxane, to produce crude monomeric formaldehyde, admixing the crude formaldehyde directly with carbon dioxide under super-atmospheric pressure to form a liquid reaction mixture and polymerizing the the formaldehyde in the presence of a carboxylic acid anhydride in the amount of up to 50 mole percent of the formaldehyde and then heating the reaction system to a temperature higher than 100° C.

2. A process according to claim 1, wherein the reaction system is heated at 150° C.

3. A process according to claim 1, wherein the carboxylic acid anhydride is acetic anhydride, propionic anhydride, benzoic anhydride, stearic anhydride or caproic anhydride.

References Cited

UNITED STATES PATENTS

| | | | |
|---|---|---|---|
| 3,297,644 | 1/1967 | Wagner et al. | 260—67 |
| 3,305,529 | 2/1967 | Reynolds. | |
| 3,309,296 | 3/1967 | Fukui et al. | |

WILLIAM H. SHORT, Primary Examiner

L. M. PHYNES, Assistant Examiner

U.S. Cl. X.R.

204—159.21